United States Patent [19]
Sato et al.

[11] Patent Number: 5,345,374
[45] Date of Patent: Sep. 6, 1994

[54] POWER SOURCE FOR SUPPLYING DC VOLTAGE BY CONVERTING AC VOLTAGE FROM AC SOURCE

[75] Inventors: Masayoshi Sato; Kenichi Onda, both of Hitachi, Japan

[73] Assignee: Hitachi, Ltd., Tokyo, Japan

[21] Appl. No.: 64,642

[22] Filed: May 21, 1993

[30] Foreign Application Priority Data

May 27, 1992 [JP] Japan ................. 4-158840

[51] Int. Cl.⁵ .................. H02M 3/335; H02M 7/538
[52] U.S. Cl. .................................. 363/24; 363/133
[58] Field of Search ............... 363/16, 24, 25, 26, 363/97, 133, 134

[56] References Cited

U.S. PATENT DOCUMENTS

| | | | |
|---|---|---|---|
| 4,280,174 | 7/1981 | Sonda | 363/24 |
| 4,811,187 | 3/1989 | Nakajima et al. | 363/2 J |
| 5,019,952 | 5/1991 | Smolenski et al. | 363/16 |
| 5,268,547 | 12/1993 | Bessyo et al. | 363/97 X |

FOREIGN PATENT DOCUMENTS 1-152960 6/1989 Japan .
1-252174 10/1989 Japan .

Primary Examiner—Steven L. Stephan
Assistant Examiner—E. To
Attorney, Agent, or Firm—Antonelli, Terry, Stout & Kraus

[57] ABSTRACT

A power source having a first rectifier, a transformer having a primary coil and a secondary coil, switching elements having one end thereof connected to one of the terminals of the primary coil, a capacitor connected between other ends of the switching elements, diodes respectively connected between the terminals of the primary coil and the other ends of the switching elements, a choke coil for supplying the input DC voltage from the first rectifier directly to one of the terminals of the primary coil, and a second rectifier for supplying an output DC voltage to a load by rectifying the output AC voltage from the secondary coil.

10 Claims, 3 Drawing Sheets

POWER SOURCE FOR SUPPLYING DC VOLTAGE BY CONVERTING AC VOLTAGE FROM AC SOURCE

BACKGROUND OF THE INVENTION

This invention relates to a power source for supplying a DC voltage to a load by converting an AC voltage from an AC line having low harmonic components of an AC current so that energy loss of the power source is very low.

An AC/DC converter which directly rectifies AC 100 [V] supplied from an AC line so as to provide a DC voltage of about 130 [V], so called a line operation type converter, is widely used as a compact DC power source. Japanese Patent Laid-open No. 1-252174 may be cited as an example of such apparatus.

In the converter as stated above, output DC voltage is controlled by changing a duty ratio of an ON/OFF time duration of switching elements Q1, Q2 which are connected to an output transformer so as to keep the output DC voltage constant. FIG. 6 shows wave forms in a rectifier for rectifying an input line AC Voltage (a). An input AC line current flows as shown in (b) of the FIG. 6 and peak value (b) of the current generated by switching the elements Q1, Q2 becomes three to five times the peak value of the effective current of the input AC current.

Such current contains many harmonic components such that there arises serious bad influences on the AC line or periphery instruments. In order to improve such problem, an apparatus as shown in Japanese Laid-open 1-152960 is proposed.

That is, switching element 14 for chopping the input DC voltage is operated with a high frequency more than several ten KHZ and a choke coil 13 is provided between the rectifier and the switching elements 4, 5, and the harmonics can be removed from the current as shown in FIG. 7. Therefore, the rectified DC voltage is chopped as shown in (b) and the current mixed with no harmonics flows as shown in (c).

But, in the improved apparatus, as the switching element and flywheel diode operated with the high frequency are needed, the efficiency of the apparatus becomes very low.

SUMMARY OF THE INVENTION

The object of the present invention is to provide a compact apparatus having high efficiency which is improved with respect to the above stated problem.

In order to attain the object stated above, an improved power source is provided, said power source comprising a first rectifier for supplying an input DC voltage by rectifying an AC input voltage, a transformer having a primary coil and a secondary coil which outputs an AC output voltage, switching elements having one ends thereof connected to at least one of terminals of the primary coil, a capacitor connected between other ends of the switching elements, diodes respectively connected between said terminals of the primary coil and the other ends of the switching elements, a choke coil for supplying the input DC voltage from the first rectifier to the terminals of the primary coil, and a second rectifier for supplying an output DC voltage to a load by rectifying the output AC voltage from the secondary coil.

In the present invention, one of the switching elements is commonly used as a switching element for switching the DC current flowing into the transformer so as to control the output voltage of the transformer and an element for feeding back an energy from the transformer to the choke coil, and one of the diodes is commonly used as a diode for supplying the energy accumulated in the choke coil to the capacitance and a flywheel diode for feeding back an energy from the transformer to the capacitor. In this way, as there is no need for using many switching elements and diodes, and the switching elements is operated with the low frequency in the apparatus of the present invention, the efficiency of the power source becomes higher.

DETAILED DESCRIPTION OF THE PREFERRED EMBODIMENTS

Figure 1:
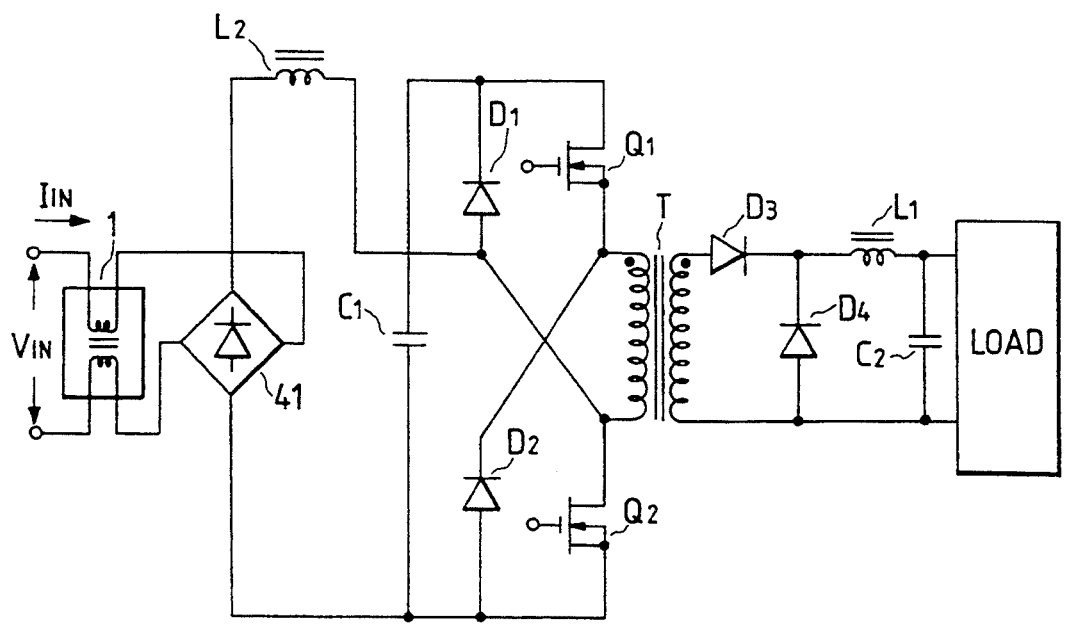
FIG. 1 is a diagram of a circuit constitution illustrating an embodiment of a power source in the present invention.

FIG. 1 shows a diagram of an embodiment of a power source in the present invention.

Figure 2:
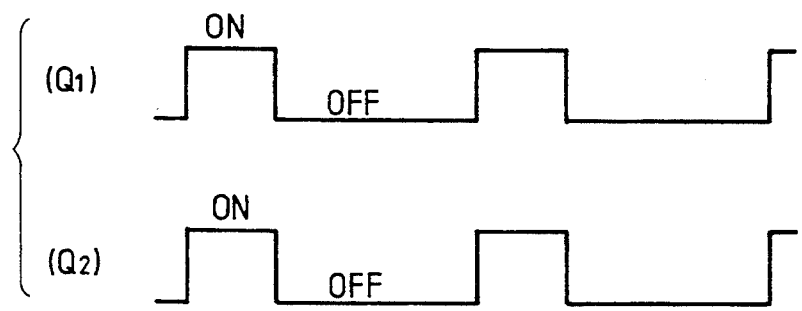
FIGS. 2 and 3 are diagrams for illustrating the operation of the embodiment of the power source in the present invention shown in the FIG. 1.
Figure 3:
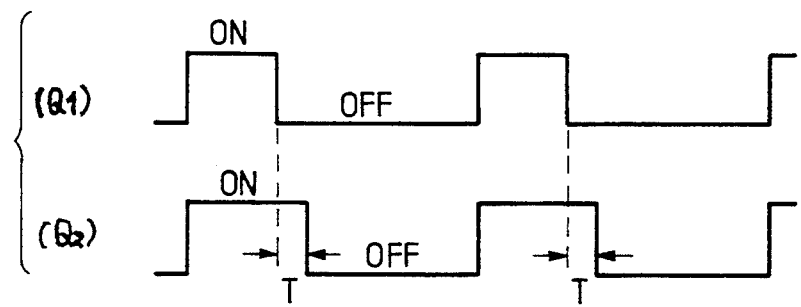

A bridge type rectifier 41 rectifies input AC voltage Vin supplied from an AC line through an AC line noise filter 1 and outputs an input DC voltage to a terminal of a primary coil of a transformer T through a choke coil L2. Every one ends of switching elements Q1, Q2 such as switching transistors are respectively connected to terminals of primary coil of the transformer T and the switching elements Q1, Q2 is controlled as shown in FIGS. 2 and 3. Diodes D1, D2 are respectively connected between the other ends of the switching elements Q1, Q2 and the terminals of the primary coil of the transformer T. A capacitor C1 for charging the energy from the choke coil L2 is connected between the other ends of the switching elements Q1, Q2. Output AC voltage from a secondary coil of the transformer T is rectified by diodes D3, D4 and the rectified voltage is supplied to the load through a filter constructed with a reactance L1 and a capacitor C2.

In this embodiment, the switching element Q2 concurrently has a function as a switching element for accumulating an energy at the choke coil L2, and the diode D1 for supplying the energy from the choke coil to the capacitor concurrently has a function as a flywheel diode for feeding back an energy of the transformer T to the capacitor C1.

When the switching elements Q1, Q2 become simultaneously ON as shown in FIG. 2, a first closed circuit and a second closed circuit as shown below are practically formed in the circuit shown in the FIG. 1.
(1) The first closed circuit: the switching element Q1 →the primary coil of the transformer→the switching element Q2→the capacitor C1→the switching element Q1
(2) The second closed circuit: the bridge type rectifier 41→the choke coil L2→the switching element Q2→the bridge type rectifier 41

In the same way, when the switching elements Q1, Q2 become simultaneously OFF as shown in FIG. 2, a first closed circuit and a second closed circuit as shown below are practically formed in the circuit shown in FIG. 1.

(3) The third closed circuit: the primary coil of the transformer T→the diode D1→the capacitor C1→the diode D2→the primary coil of the transformer T (4) The fourth closed circuit: the bridge type rectifier 41→the choke coil L2→the diode D1→the capacitor C1→ the bridge type rectifier 41

In the power source having a construction stated above, when the switching elements are switched on, the energy charged in the capacitor C1 is transmitted through the above first closed circuit so as to flow a current to the load.

In the second closed circuit, the current is flown into the choke coil L2 through the switching element Q2 and the bridge type rectifier 41. As the switching element Q2 is controlled so as to be switched on and off so that a mean value of the current flown through the choke coil L2 is proportional to the input AC voltage Vin, the input AC current Iin from the AC line is flown so as to be proportional to the input AC voltage Vin and the harmonic components contained in the current may be removed.

In the above third closed circuit, when the switching elements Q1, Q2 are switched off, the energy accumulated in the transformer T is fed back to the capacitor C1 through the diodes D1, D2.

Further in the above fourth closed circuits, the energy accumulated in the choke coil L2 is flown through the diode D1 so as to be charged in the capacitor C1.

In this embodiment of the power source, the harmonic elements in the input AC current are effectively removed without adding any special switching element operated with high frequency such as a further flywheel diode, etc.

Figure 5:
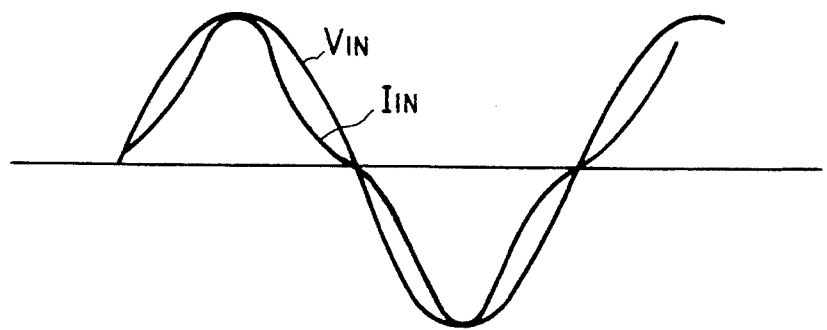
FIG. 5 is a diagram for illustrating a wave form of an input AC voltage and an input AC current in FIG. 1.
Figure 6:
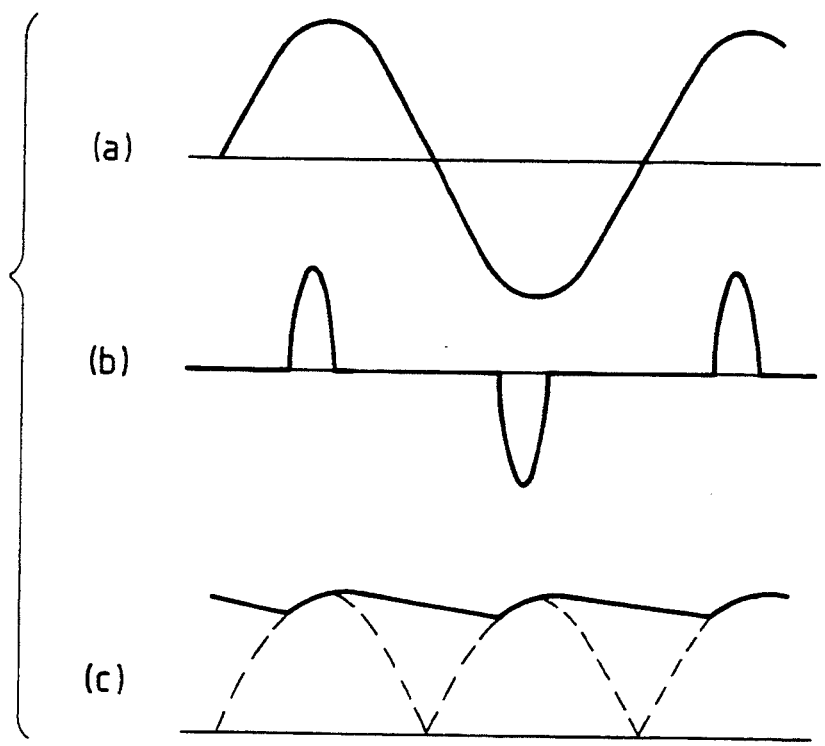
FIGS. 6 to 7 are diagrams for illustrating problems of prior arts.
Figure 7:
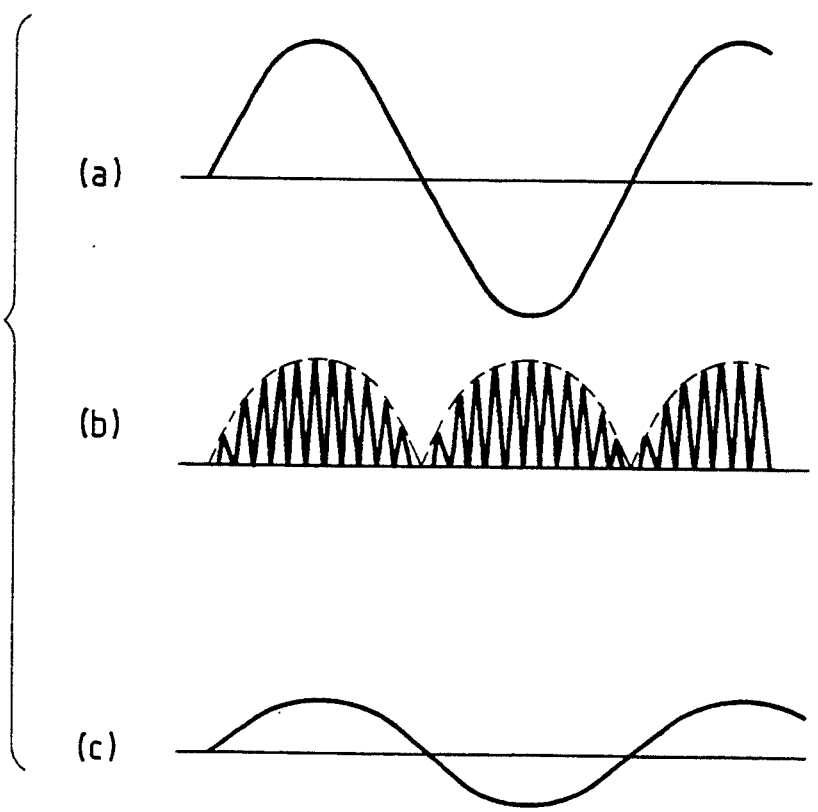

Further to the above embodiment, the switching elements Q1, Q2 are controlled so as to be switched on and off in a same phase and a same timing, and the wave form of the input AC current Iin is deformed as shown in FIG. 5 and it becomes different from the wave form of the input AC voltage Vin. In order to improve the deformation of the AC current, the ON time of the switching element Q2 is controlled in proportional to a value of the input AC voltage so as to be longer than the ON time of the switching element Q1.

Figure 4:
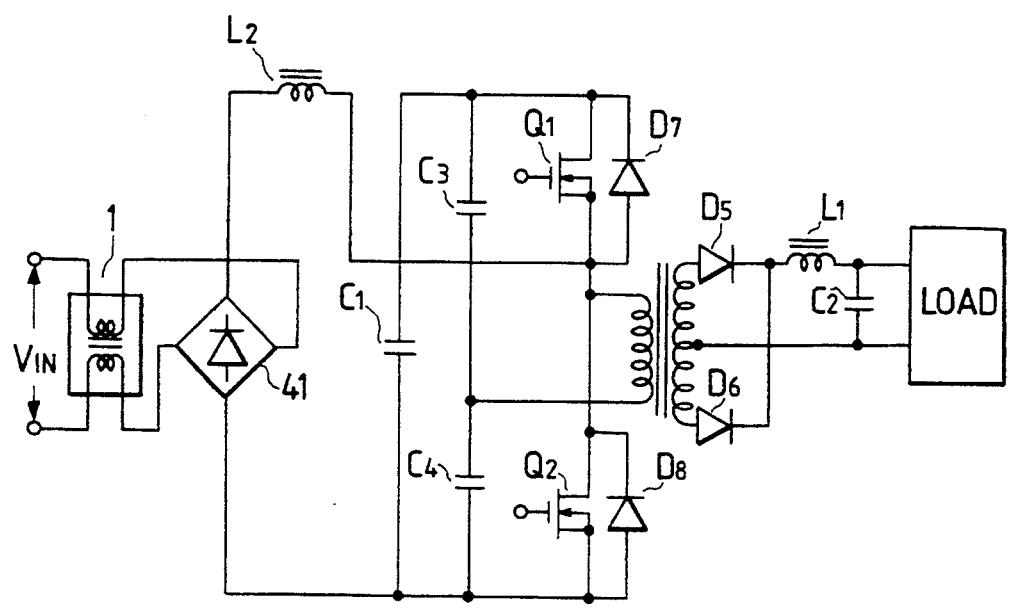
FIG. 4 is a diagram for illustrating another embodiment of the power source in the present invention.

Another embodiment of power source in the present invention is shown in FIG. 4. The elements attached the same numerals as those in the FIG. 1 show the same elements as those in the FIG. 1. Capacitors C3, C4 are provided so as to serially be connected to the capacitor C1 and central connected portion of the serially connected capacitors C3, C4 is connected to the terminal of the primary coil of the transformer T. Diodes D7, D8 are respectively connected to the switching elements Q1, Q2 in parallel.

In the embodiment shown in the FIG. 4, control signals added to the switching element Q1 for switching on and off the element Q1 are shifted 180 degree from the phase of control signals added to the switching element Q2, and thereby, the output DC voltage at the capacitor C2 is controlled so as to keep a constant voltage.

While the switching element Q2 is switched on, the energy is accumulated in the choke coil L2 and the accumulated energy is flown through the diode D7 into the capacitors C1, C3, C4 while the switching element Q2 is switched Off.

In the same way as the embodiments shown in the FIG. 1, the switching element Q2 shown in the FIG. 4 is used as a device having both of two functions for controlling the output DC voltage supplied to the load and for accumulating the energy to the choke coil L2. Furthermore, a diode D7 has both functions as one for accumulating the energy into the choke coil L2 and the other for charging the energy into the capacitor C1.

In both of the embodiments shown in the FIGS. 1 and 4, the power sources are installed on a semiconductor substrate connected on a metal plate as a cooling fin, the heated power source is effectively cooled down and a very compact power source may be provided.

We claim:

1. A power source comprising:
   a first rectifier for supplying an input DC voltage by rectifying an AC input voltage,
   a transformer having a primary coil and a secondary coil which outputs an output AC voltage,
   first and second switching elements respectively having a first element terminal connected to at least one of a first and second primary terminal of said primary coil,
   a capacitor connected between second element terminals of said first and second switching elements,
   first and second diodes respectively having a first diode terminal connected to one of said first and second primary terminals of said primary coil and a second diode terminal connected to a second element terminal of one of said first and second switching elements,
   a choke coil for supplying said input DC voltage from said first rectifier directly to said primary coil, said choke coil being directly connected to one of said first and second primary terminals of said primary coil,
   a connection between said second element terminal of one of said first and second switching elements and said first rectifier, and
   a second rectifier for supplying an output DC voltage to a load by rectifying said output AC footage from said secondary coil.

2. A power source as defined in claim 1, wherein a first element terminal of said first switching element and a first terminal of said second switching element are respectively connected to said first and second primary terminals of said primary coil.

3. A power source as defined in claim 2, where said first rectifier has a rectifier for rectifying AC voltage supplied through an AC line filter for eliminating an electrical noise on an AC line.

4. A power source as defined in claim 2, wherein one of said first and second switching elements provides both control of said AC output voltage across an output of said transformer and feed-back of energy from said transformer to said choke coil, and wherein one of said first and second diodes provides both supply of energy accumulated in said choke coil to said capacitor and flywheel feed-back of energy from said transformer to said capacitor.

5. A power source as defined in claim 1, wherein first element terminals of said first and second switching elements ar commonly connected to one of said first and second primary terminals of said primary coil and an opposite one of said first and second primary terminals of said primary coil is connected to commonly connected first capacitor terminals at which two dividing capacitors are serially connected, wherein second capacitor terminals of said two dividing capacitors are connected between said capacitor.

6. A power source as defined in claim 5,
wherein said first rectifier has a rectifier for rectifying AC voltage supplied through an AC line filter for eliminating an electrical noise on an AC line.

7. A power source a defined in claim 5,
wherein one of said first and second switching elements provides both control of said AC output voltages across an output of said transformer and feed-back of energy from said transformer to said choke coil, and
wherein one of said first and second diodes provides both supply of energy accumulated in said choke coil to at least one of said capacitors and flywheel feed-back of energy from said transformer to at least one of said capacitors.

8. A power source comprising:
an input rectifier for rectifying an AC input voltage and supplying an input DC voltage across a first rectifier terminal and a second rectifier terminal,
a transformer having a primary coil with a first primary terminal and a second primary terminal, and a secondary coil which outputs an output AC voltage,
a first switching element having a first element terminal connected to said first primary terminal,
a second switching element having a first element terminal connected to said second primary terminal,
a capacitor having a first capacitor terminal connected to a second element terminal of said first switching element, and a second capacitor terminal connected to a second element terminal of said second switching element,
a first diode having a first diode terminal connected to said second primary terminal, and a second diode terminal connected to said second element terminal of said first switching element,
a second diode having a first diode terminal connected to said second element terminal of said second switching element, and a second diode terminal connected to said first primary terminal,
a choke coil having a first coil terminal connected to said first rectifier terminal, and a second coil terminal connected to said second primary terminal,
a connection between said second rectifier terminal and said second element terminal of said second switching element, and
an output rectifier for rectifying said output AC voltage from said secondary coil, for supplying an output DC voltage.

9. A power source comprising:
an input rectifier for rectifying an AC input voltage and supplying an input DC voltage across a first rectifier terminal and a second rectifier terminal,
a transformer having a primary coil with a first primary terminal and a second primary terminal, and a secondary coil which outputs an output AC voltage,
a first switching element having a first element terminal connected to said first primary terminal,
a second switching element having a first element terminal connected to said first primary terminal,
a capacitor having a first capacitor terminal connected to a second element terminal of said first switching element, and a second capacitor terminal connected to a second element terminal of said second switching element,
a first diode having a first diode terminal connected to said first primary terminal, and a second diode terminal connected to said second element terminal of said first switching element,
a second diode having a first diode terminal connected to said second element terminal of said second switching element, and a second diode terminal connected to said first primary terminal,
a dividing capacitance comprising a series connection of a first dividing capacitor and a second dividing capacitor, a first capacitance terminal of said dividing capacitance being connected to said second element terminal of said first switching element, a second capacitance terminal of said dividing capacitance being connected to said second element terminal of said second switching element, and a common capacitance terminal between said first dividing capacitor and said second dividing capacitor being connected to said second primary terminal,
a choke coil having a first coil terminal connected to said first rectifier terminal, and a second coil terminal connected to said first primary terminal,
a connection between said second rectifier terminal and said second element terminal of said second switching element, and
an output rectifier for rectifying said output AC voltage from said secondary coil, for supplying an output DC voltage.

10. A power source comprising:
an input rectifier for rectifying an AC input voltage and supplying an input DC voltage across a first rectifier terminal and a second rectifier terminal,
a transformer having a primary coil with a first primary terminal and a second primary terminal, and a secondary coil which outputs an output AC voltage,
a choke coil having a first coil terminal connected to said first rectifier terminal, and a second coil terminal connected to one of said first primary terminal and said second primary terminal,
a capacitor element providing a capacitance across said first primary terminal and said second primary terminal,
a switching element in the form of a single electronic component and being connected to said input rectifier, said transformer and said choke coil to provide both control of said output AC voltage across an output of said transformer and feed-back of energy from said transformer to said choke coil,
a diode element in the form of a single electronic component and being connected to said input rectifier, said transformer and said choke coil to provide both supply of energy accumulated in said choke coil to said capacitor element and flywheel feed-back of energy from said transformer to said capacitor element, and
an output rectifier for rectifying said output AC voltage from said secondary coil, for supplying an output DC voltage.

* * * * *